Figure 1:
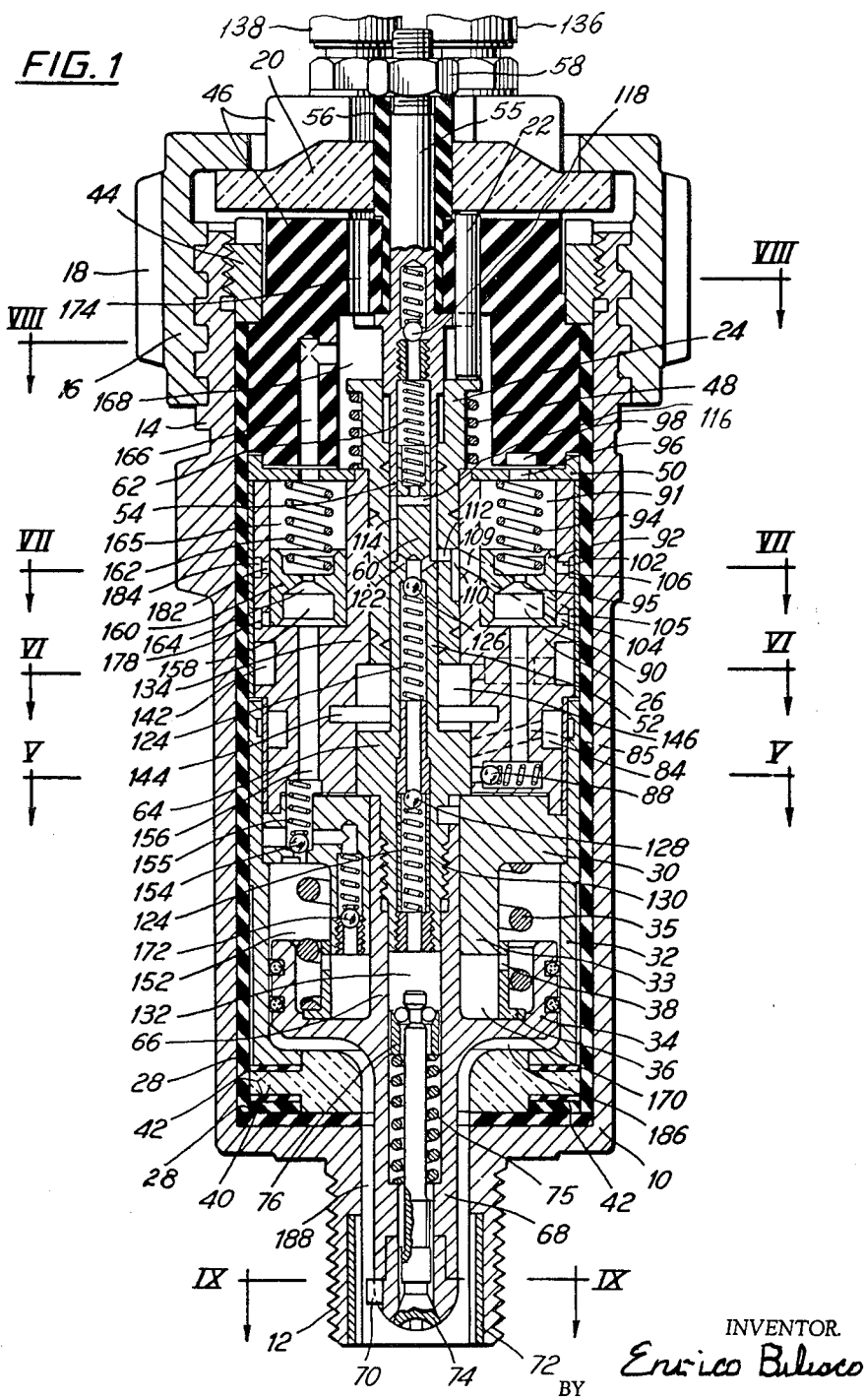

Feb. 22, 1966     E. BILISCO     3,236,219
METHOD AND RELATED DEVICE FOR FEEDING TWO-AND
FOUR-STROKE INTERNAL COMBUSTION ENGINES
Filed Aug. 28, 1962     6 Sheets-Sheet 1

INVENTOR.
Enrico Bilisco
BY
Stevens Davis Miller
& Mosher

INVENTOR.
Enrico Bilisco
BY Stevens Davis Miller & Mosher

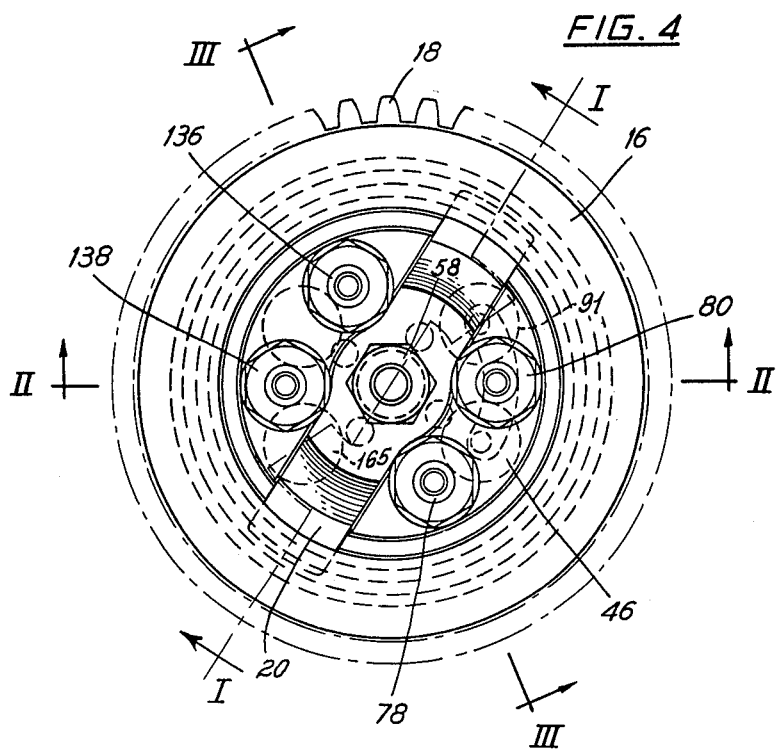
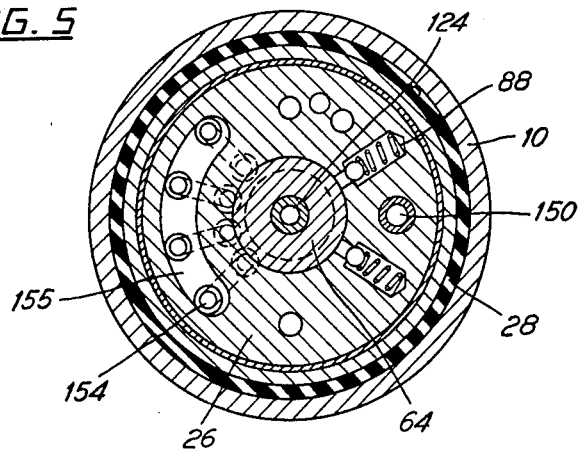

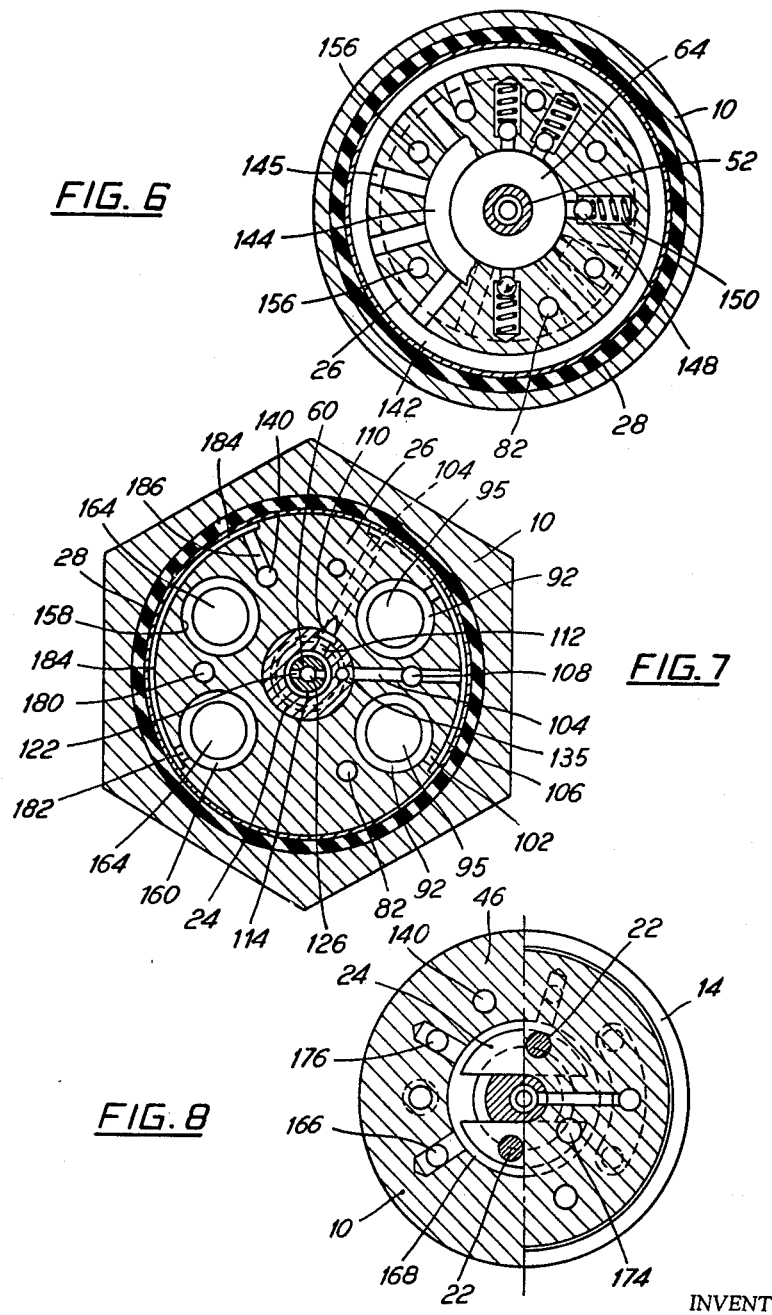

United States Patent Office 3,236,219
Patented Feb. 22, 1966

3,236,219
METHOD AND RELATED DEVICE FOR FEEDING TWO- AND FOUR-STROKE INTERNAL COMBUSTION ENGINES
Enrico Bilisco, Piazzale Susa 11, Milan, Italy
Filed Aug. 28, 1962, Ser. No. 219,932
Claims priority, application Italy, Sept. 1, 1961, 15,939
14 Claims. (Cl. 123—139)

This invention concerns a method for feeding reciprocating internal combustion spark engines, of both two- and four-stroke cycle, and a device by which such method is carried into practice.

The main object of the invention is to provide for the automatic, and efficient metering and injection of fuel into the single cylinders of an internal combustion engine, by utilizing the air or other gases that are compressed by the engine during the compression stroke. The fuel injection is performed in such a manner as to ensure a dependable ignition and a complete combustion of the injected fuel, thereby improving, as it can be readily appreciated, both the performance and the efficiency of the engine. More particularly, the invention intends to provide a device that can be fitted to the combustion chamber of each engine cylinder, in place of the conventional spark plug, without having to make any changes or adjustments in the engine.

Moreover, the device automatically adjusts the degree of injection advance, to carry out the formation of the fuel-air mixture within a very short time, and in a manner so that even the ignition of a lean mixture, will take place progressively to completion thereof, preventing knocking and other combustion anomalies. In addition to the possibility of burning unusually lean fuel-air mixtures, the combustion caused by the device according to the invention allows it to materially reduce the fuel consumption, even with the use of low-grade fuels, or of fuels showing a very wide boiling range.

The method according to the invention, wherein the air compressed in the engine cylinder, causes the fuel to be injected into the engine, whereafter the fuel-air mixture thus formed is ignited by an electric spark, a portion of the inlet air is mixed with fuel toward the end of compression stroke, bringing then the resulting mixture into a precombustion chamber having a variable volume that communicates with the engine main combustion chamber, whereupon the last portion of mixture flowing into the pre-chamber is ignited, to fire the whole mixture present within the pre-chamber, and to cause the explosion thereof, which results in a flow of gases into the engine cylinder, and an ignition of the fuel-air mixture present therein, thereby promoting, due to whirling motion imparted to surrounding air, the formation of further quantities of fuel-air mixture, up to exhaustion of fuel present.

According to the invention, the fuel to be injected is previously heated and atomized, and then vaporized within the engine combustion chamber, according to a law independent from the r.p.m. of engine.

The device by which the method according to the invention is carried into practice, comprises a first cylinder-piston unit, responsive to the pressure which is cyclically built-up within the engine combustion chamber, and designed to drive the movable component of a second cylinder-piston unit, by which fuel is fed to an injector nozzle, a pre-chamber that is pneumatically connected with the engine main combustion chamber, and a spring-loaded piston slidingly fitted in said pre-chamber, to alter the volume thereof according to the pressure of air which is being compressed by the engine. The device is equipped with the injector nozzle, as well as with an electrode, designed to cooperate with a fixed counter-electrode, said electrodes fitted in the duct through which the variable volume pre-chamber is connected with the engine combustion chamber, and the air-fuel mixture is ignited by the spark which is cyclically struck therebetween. The movable electrode is advantageously located between the injection nozzle and the variable volume pre-chamber, to ignite the air-fuel mixture that is flowing thereinto.

In a preferred embodiment form of the device according to the invention, there is provided a cylinder ending with a perforated tail, allowing it to be removably secured to the engine, and through which the engine combustion chamber communicates. A piston controlled by spring means is slidingly fitted within said cylinder. A tubular piston rod is fixed to said piston, and axially extends through said perforated tail, and is the fixed electrode secured to inside wall of tail, while a movable electrode is secured to said piston rod. An injection nozzle is fitted at the free end of the tubular piston rod, coaxially with the cylinder-piston unit of an injection pump, the piston unit being secured to the first-mentioned piston, which is axially bored for feeding the injection nozzle.

The device is also fitted with a lubricant recirculating system, for the lubrication and cooling of hotter components thereof, as well as for joint sealing purposes.

The invention will now be disclosed in the following description, taken with the accompanying drawings, wherein a preferred embodiment form thereof is shown.

Figure 2:
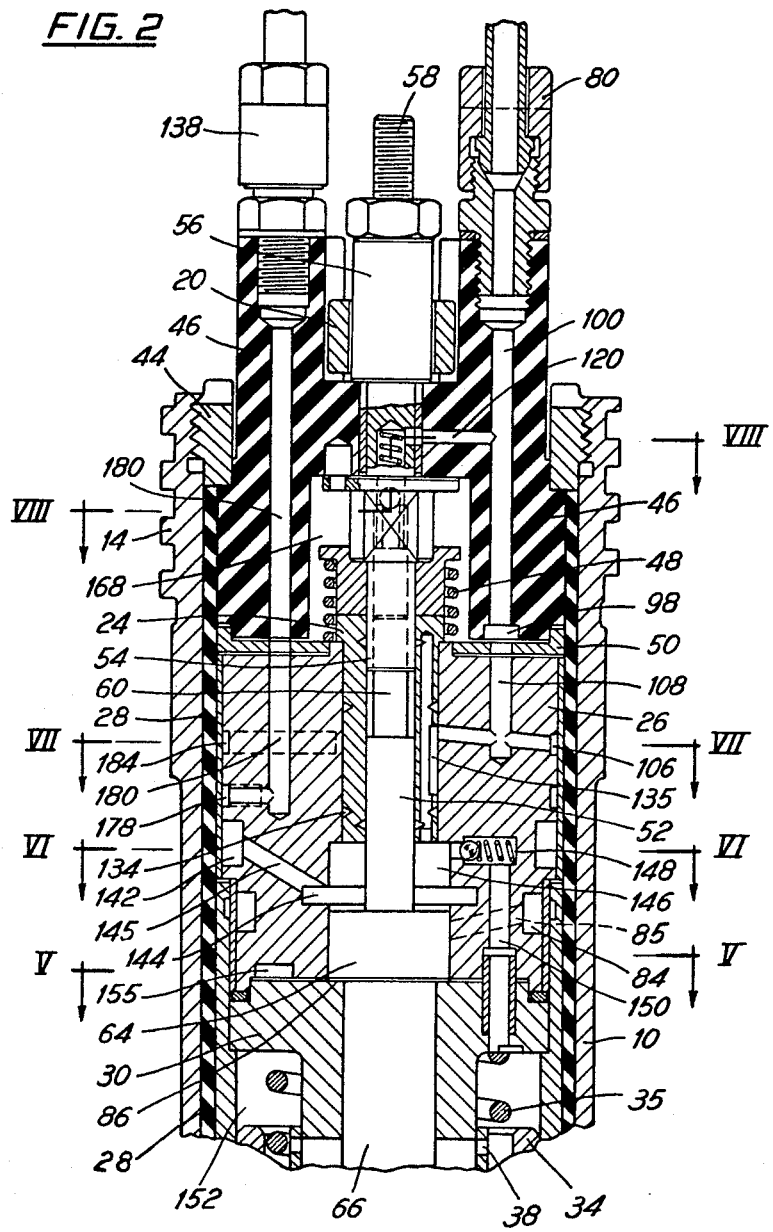
Figure 3:
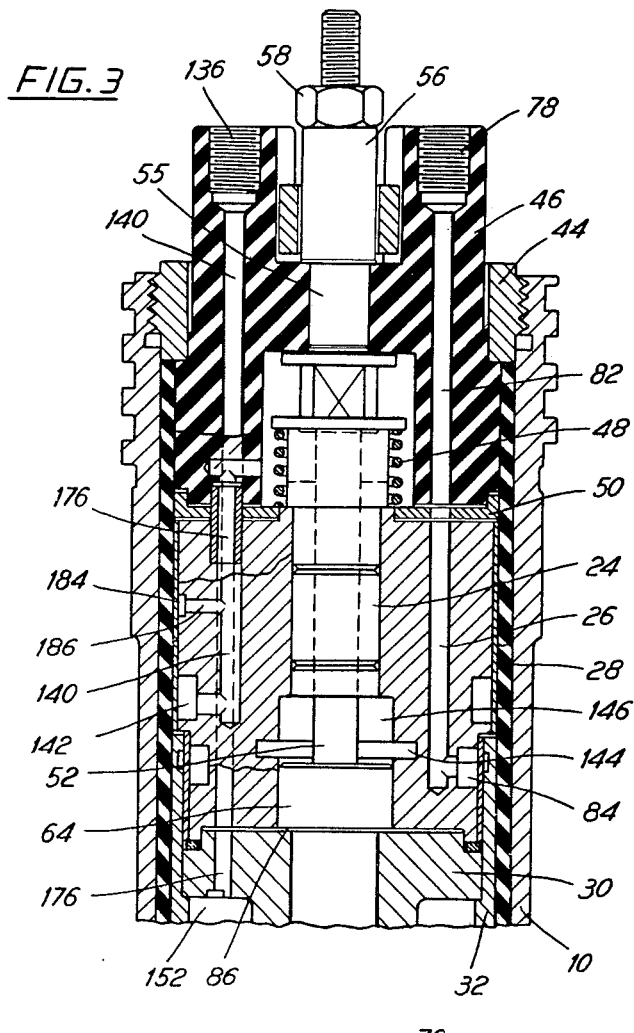

FIGS. 1, 2 and 3 are axial sectional views of the device according to the invention, taken along the lines I—I, II—II and III—III of FIG. 4.

Figure 10:
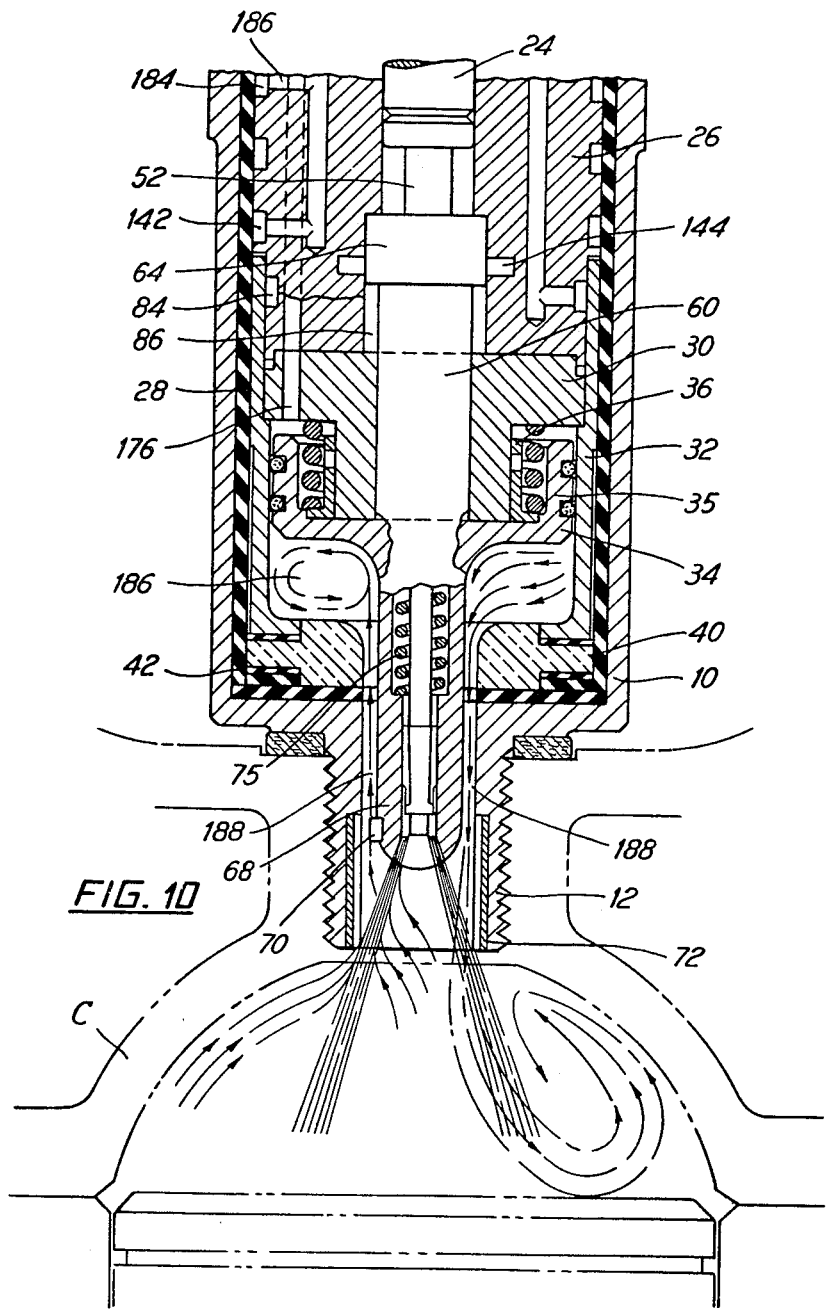

In the FIGS. 1, 2 and 3, the different components of device are shown in their starting positions (beginning of engine compression stroke), while in the FIG. 10, same components are shown in their final positions (firing and engine expansion stroke).

FIG. 4 is a plan view of the device.

FIGS. 5 to 8 inclusive are sectional views respectively taken along the lines V—V to VIII—VIII of FIG. 2.

Figure 9:
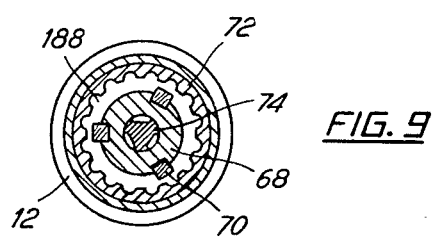

FIG. 9 is a sectional view taken along the line IX—IX of FIG. 1.

FIG. 10, similar to FIG. 2, shows the axial positions of different components of the device during the injection stage.

Referring now to above figures, the device consists of a shell, whose lower end is formed with a hollow tail 12 having an outer thread, that allows it to be screwed into the cylinder head C (see FIG. 10), and more precisely in place of the conventional engine firing plug. A cap 16 is screwed on a steep pitch thread 14, cut on the upper end of said shell 10. A toothed rod (not shown) is in mesh with an outer toothing 18 of said cap, and extends into engagement with all similar toothings formed on the other devices, with which the other engine cylinders are fitted. Said toothed rod is connected in a known manner with the accelerator by which the r.p.m. of engine is controlled.

A cross member 20 is retained by the edge of bored bottom of cap 16. A bush 24, designed to cooperate with member 20 through the pins 22, is slidingly fitted, with a tight fit, in the axial bore of a cylindric block 26, which is locked, as explained later in more detail, within the shell 10, and is electrically insulated therefrom by means of an insulating sheath 28. The upper end of a cylinder 32 is closed by a bottom plate 30, secured to lower end of cylindric block 26. A piston 34, slidingly fitted in said cylinder 32, is acted upon by the spring 35, one end of which is secured to bottom plate 30.

A cylinder 36 is designed to tightly cooperate with a cylindrical extension 33, extending downwardly from the bottom plate 30, co-axially with the piston 34. The inner and outer annular chambers 170 and 152 respectively, (see FIG. 1) are defined by cylinder 36 and piston 34 to form the inner chamber 170, and cylinder 36 in conjunction with piston 34 and cylindrical extension 33 to form the outer chamber 152 is kept against the piston 34 by the action of spring 35. The inner and outer chambers communicate with one another through a row of peripheral holes 38, cut near the upper end of cylinder 36.

The lower end of cylinder 32 rests against a perforated disk 40, made of an electrically insulating and heat resisting material, which is forced, with the interposition of electrically insulating packings 42, against the bottom of shell 10, together with the bottom plate 30 and the cylindrical block 26, by a threaded ring 44, screwed on the upper end of shell 10, and bearing against the edge of a cylindrical counter block 46, made of an electrically insulating material.

All the above components are fitted with one another as above stated, within the shell 10, and are electrically insulated therefrom by means of the sheath 28 and insulating material of block 46.

The bush 24 is designed to act as a piston, and is acted upon by a spring 48, whose lower end is secured to a disk 50, inserted between the block 26 and the counterblock 46, while upper end of spring 48 is secured to a flanged portion of bush 24, so the bush is lifted thereby. Inside of bush 24 are slidingly and sealingly fitted the lower piston 52 and the upper piston 54 (see FIG. 1), which is secured to a tailpiece 55, which in turn is secured, with the interposition of an insulating hose 56, to counterblock 46, by means of a bolt 58, fixed to said tailpiece, and designed to act as a terminal, i.e. to accommodate the high voltage cable of the electric generator (magneto), with which the engine is equipped.

The piston 52 is formed with an upper extension 60, designed to act as a piston, slidingly fitted in an axial bore of upper piston 54. The piston 52 is electrically connected with the upper piston 54, and thus with the terminal 58 by means of a spring 62, interposed between the extension 60 and said upper piston.

The lower end of piston 52 is formed with a cylindrical enlargement 64, acting as a further piston co-axial with piston 52, and slidingly fitted in a seat machined on the lower end of the block 26, co-axially with the bore in which the bush 24 is fitted, and which is closed by the bottom plate 30.

The piston 52 is connected by a tubular stem 66 with the piston 34. Such stem extends from the opposite side of piston 34, thus forming a tubular section 68, which houses a fuel injection valve assembly and extends with a given clearance into the bore of tailpiece 12. Suitable projections 70, formed near the end of section 68, provide electrodes, with an annular electrode 72, secured in any suitable manner within the bore of tailpiece 12, and connected, with the other terminal of electrical generator.

The electrodes 70 and 72 represent a conventional spark plug, wherein the axially movable electrode 70 is kept in constant spaced relationship with respect to the other electrode 72.

A valve 74, slidingly fitted inside of the end of tubular section 68, is loaded by a spring 75, biasing it against its seat, along with any pressure built up within the cylinder C.

The hydraulic circuits of device, for supplying fuel to different parts of the device, will now be described.

The fuel pipes are connected to two fittings 78 and 80, which are fitted to counterblock 46, and fuel is supplied thereto from a fuel feeder, and tank in which an excess of fuel, discharged from the device is collected. The fitting 78 is connected, by means of a duct 82 (FIG. 3), formed in the block 26 and counterblock 46, with an anular chamber 84, that is machined on the outer contour of block 26. The fuel is drawn from chamber 84, through the ducts 85, as uncovered by the upward movement of piston 64 of the low pressure pump, and is collected in the annular chamber 86, defined by the upper surface of plate 30, a machined recess in the lower portion of block 26 and the underside of piston 64, in which machined section said piston 64 is slidingly fitted. The fuel then flows through a valve 88 during the downward movement of piston 64 (see FIG. 1) to two cylindrical chambers 90 (only one of which is shown in FIG. 1) axially formed within the block 26 in a radial position with respect to the axis of the block 26 and defined by recesses in said block into which a piston 92, loaded by a spring 94, is slidingly fitted in each one of chambers 90, thereby forming each of said chambers 90 into a pressure accumulator. The chamber 90 is connected with the outlet fitting 80 through a gauged hole 95 of piston 92, an opposite chamber 91, a hole 96 (drilled in the disk 50), a groove 98 and a duct 100 (see FIG. 2).

When the piston 92 is lifted, the chamber 90 is put in communication with two conveniently located holes 102 and 104 (see FIG. 7). Hole 102 leads to a groove 106, connected through the duct 108 (FIGS. 2 and 7) with the duct 100, while hole 104 leads, through a similar groove 105, to a radial hole 109, both machined in the block 26. A groove 110, longitudinally cut in a suitable location in the bush 24, leads into the hole 112, and into the annular chamber 114 defined by extension 60 of piston 52, and by the bush 24 in which piston 52 is slidingly fitted.

The fuel to be injected is collected in the chamber 114 through the radial holes 116 drilled in suitable locations on the extension 60. The check valve 118 fitted in the tailpiece 55 and the hole 120 drilled in the counterblock 46, communicate with the duct 100 for recovery of excess fuel returned through the fitting 80 into the fuel tank. Chamber 114 is also connected with the injector 68 through the radial holes 122, drilled near the upper end of piston 52, and lead to a duct 124, extending axially across piston 52, and controlled by a first check valve 126, and by a second check valve 128.

Valve 128 is retained by a hollow shank 130, secured to tubular rod 66, in which the bore, together with the lower end of said second check valve 128 and a bore in tubular section 68 form a chamber 132 in which the fuel is collected and pre-heated as will be explained below, and into which the duct 124 leads.

The spring 75, fitted in the above chamber, is designed to act, through the ring 76, on the injection valve 74, which is opened by the fuel pressure in the chamber 132.

Narrow annular channels 134, cut on both outer and inner surfaces of bush 24, are connected, through a slotted collector duct 135 (FIG. 2), with the discharge duct 108, for the recovery of any fuel leakages from bush 24.

Since the lubricant must act also as a sealing means for the movable joints and as a coolant for the different components of the device, the related piping system is designed in such a manner as to allow a continuous circulation of same lubricant inside of the whole device.

The fittings 136 and 138, respectively, for the inlet and outlet of lubricating oil, similar to fittings 78 and 80, are fitted thereadjacent, in the upper section of counterblock 46. An oil tank is connected, through the fitting 136, with a duct 140 which extends longitudinally through the counterblock 46 and the block 26, and leads into an annular groove 142, cut in the surface of block 26.

The lubricating oil continually flows from the groove 142, into a complementary annular groove 144, through the radial ducts 145 (see FIGS. 2, 3 and 6).

Groove 144 is cut inside of the upper section 146 of the machined recess in the lower portion of block 26 within which recess the piston 64 is slidingly fitted. Piston 64 functions as the plunger of a double acting pump for fuel and lubricant. The function in the fuel circuit has been described above. In the lubricating oil circuit, during each downward stroke, piston 64 uncovers the complemental groove 144, to bring it into communication with the chamber 146, opposite annular chamber 86. The upper section of chamber 146 is connected, through a valve 148 (see FIGS. 2 and 6), with a duct 150, that extends downward, and leads through the block 26 and the bottom plate 30, into an annular chamber 152, whose bottom is provided with an annular piston formed by the piston 34 and by the movable cylinder 36. Chamber 152 is connected, through the valves 154 (see FIG. 1), with arcuate groove 155, machined on the lower face of block 26 (FIG. 5). Vertical ducts 156, drilled in the lower face of block 26 connects the groove 155 with a cylindrical chamber 160, having a gauged hole 164 (see FIG. 7). Chamber 160 is spring loaded by a spring 162 disposed in a chamber 165. Each one of said cylinder-piston units provides (similarly to cylinder-piston units 90–92), a hydraulic accumulator. The hole 164 serves as a vent, for any gases present in the oil which upon expansion are collected within the chamber 165.

Chamber 165 is connected, through the holes 166, with an axial chamber 168, in which degassing of the oil is completed. The lower section of annular chamber 152 is connected when the annular piston 34–36 is lowered, through the holes 38, machined on the movable cylinder 36, with the coaxial annular chamber 170, in turn connected, through the valve 172, the vertical hole 156 and accumulators 160, 162, with the axial chamber 168.

Chamber 168, is connected with the atmosphere by means of the holes 174, that are drilled in the counter-block 46. Chamber 168 is directly connected with the chamber 152 through a duct 176 (see FIG. 3), that extends from the upper section thereof, across the block 26 and the counterblock 46.

The plungers 160 of lubricant pressure accumulators, are lifted, by the pressure of the lubricant, against the action of springs 162, thereby establishing, through radial holes, communication between the chamber 158 and a groove 178, that extends across a portion of the surface of block 26. Groove 178 is connected with the outlet fitting 138 by means of the hole 180.

When a predetermined pressure valve is exceeded by the pressure of the oil present in the cylindrical chamber piston member 160 accumulator 160–162, the member 160 is lifted, thereby bringing chamber 158 in communication, through the hole 182, with a groove 184 (FIGS. 1, 2 and 7), cut across a portion of the contour of the block 26. Groove 184 is connected, through the hole 186 (see FIGS. 3 and 7), with the duct 140, that leads into the oil tank.

The oil, circulated by the cylinder-piston unit 33–36, is designed to lubricate and seal the hereinafter itemized components, to which motion is imparted:

(I) Cylinder-piston unit 32–34. (II) Piston 64 and chambers 86 and 146. (III) Cylinder-piston unit 24–52 of the injection pump. (IV) Bush 24 and related bore machined in the block 26. (V) Tubular rod 66 and related guide hole of hollow tailpiece 33. Moreover, the circulating oil causes, in particular, a cooling of piston 34, which is subjected to the action of hot combustion gases, since the oil is allowed to freely circulate within the chamber 152.

The lower chamber 186 of cylinder 32 opposite chamber 152 is connected with an annular duct 188, provided by the bore of shank 12, and by the cylindrical end 68 of the injector nozzle which has an annular form extending around the contour of valve 74, when valve is opened.

The electrode 70 is electrically connected, through the tubular section 68, the cylinders 64 and 60, the spring 62 and the tailpiece 55, with the terminal 58, to the high voltage generator (magneto).

The operation of device will be now described with respect to the thermal cycle of an engine device.

When the induction stroke is performed by the engine, the device is kept out of operation, and takes the position as shown in the FIG. 1.

At the beginning of compression stroke, air is forced through the annular duct 188 into the chamber 186. The piston 34 is lifted against the action exerted thereupon by the spring 35. Piston 34 moves the perforated cylinder 36, the differential piston 64, and the injection plunger 52–60 upwardly. Plunger 52–60, when lifted, will close the hole 112 through which the fuel is sent into the annular chamber 114 and the fuel that remains in the chamber 114, is then conveyed through the holes 122 and the valves 126 and 128, into the collecting chamber 132.

Chamber 132 is subjected to heating by the combustion which occurs in chamber 186 at each ignition cycle. The hot gases in chamber 186 as well as those in the engine cylinder flow around tubular stem 68 and piston 34. Hence chamber 132 is a high temperature, so the fuel flowing thereinto will be quickly heated. The pressure of the fuel, delivered to the collecting chamber 132, causes opening of the valve 74 of the injector 68, whereupon the fuel injected into the cylinder C in the form of a downwardly diverging conical crown. This annular jet of atomized fuel is struck by the countercurrent air jet that is compressed by the engine piston, and a portion of fuel is carried along with the compressed air into the chamber 186, whose volume increases, proportionally with the compression stroke, up to a maximum value, which occurs when the annular bottom of the chamber 146 is reached by piston 64.

At this time, fuel injection will continue, or be discontinued, depending on the presence or absence of an excess of fuel within the collecting chamber.

Thus, a very rich mixture is formed by the compressed air that is forced into the chamber 186, and that strikes the fuel annular jet coming out of the injector 68.

The mixture is then thoroughly mixed within chamber 186, because of the toroidal rotary motion that is imparted thereto. The flow of the compressed fuel-air mixture into the chamber 186 continues until a spark is struck between the electrodes 70–72. The very moment at which the spark is struck, does not depend on the top dead center of piston 34, but is determined in a well known manner by the engine contact breaker, in accordance to the ignition advance.

As soon as the spark strikes between the electrodes 70–72, the fuel-air mixture is ignited. Because of the upward motion of ignited mixture, toward the chamber 186, the mixture stored in chamber 186 during the first period of the compression stroke is instantaneously fired. This results in a quick reversal of gas flow in the annular duct 188, with ensuing violent ejection of gases toward the annular jet of atomized and vaporized fuel which continues to be ejected from the injector 68.

As a consequence thereof, a portion of the fuel-air mixture, present within the cylinder C, will be instantaneously fired, thus diverting the descending gas flow across the annular duct 188, from its rectilineal path. Because of the concaveness of the combustion chamber walls of cylinder C, the gas flow will then follow a spiral path, thus promoting the formation of a whirling motion, by which the fuel residue is thoroughly mixed with the pure air, and then progressively ignited.

It follows that a quick toroidal whirling motion, similar to that imparted to gaseous mixture initially present within the chamber 186, will also be imparted to the gases contained within the combustion chamber of cylinder C, so that the burning of such gases within the combustion chamber of cylinder C will continue, up to the exhaustion of fuel already present, or which is possibly still being injected. After the end of the injection step, and upon completion of combustion, the gases present within the cylinder C will expand, and at the end of said expansion, the piston 34 is returned to its initial position, by the action of spring 35, thereby discharging the burnt gases present within the chamber 186.

During the downward stroke of piston 34, the pistons 64, 60 and 52 are sucking the related fluids through the fittings 72 and 136, and such operations are repeated at each operational cycle of the engine.

The engine speed can be changed, in a well known manner by means of a suitable kinematic linkage, by which the accelerator of said engine is connected with the toothing 18 of cap 16 fitted to every one of devices with which the engine is equipped, in such a manner as to cause all caps to synchronously rotate around their threadings 14.

It follows that the cross-member 20 of each device, whose ends are engaged with the bottom of cap 16 is axially moved, so that the hole 112 of the bush 24, that is acted upon by the spring 48, is also displaced, thus increasing or decreasing the amount of fuel delivered into the collecting chamber 132.

After what is stated above, the operation of hydraulic circuit for the lubricating and cooling oil will be apparent. At any rate, it might be added that the circulation of the oil is the most intense within the chamber 152, in order to prevent an overheating of the injector and complemental components thereof.

The described and illustrated device can be easily fitted to all two- and four-stroke engines of the already known type, by screwing it in place of the conventional spark plug, after having removed the carburetor or the injection unit from the engine.

With reference to the operation of the spring-loaded pistons 90 and 160, they work as a force accumulator, for keeping steady the pressure of fuel and oil during the operation of the device, when unbalanced pressures at the different rates of operation occur. The retaining valves 126 and 86 are duplicated to prevent the back flow of fuel in the different chambers to the starting chamber. The excess fuel and the oil are discharged from the igni-injector and sent to the corresponding reservoirs, so as to be utilized again.

Air is admitted into cylinder C, without any throttling of air, during the suction stroke of the engine.

The fuel is then injected into the cylinder C at the same time, by the piston 34 of the annular chamber 186.

Collection in the annular chamber 186 of the mixture of compressed air and of a portion of the fuel injected by the igni-injector into the cylinder C then takes place counter-current to the air flowing into chamber 186.

Thereafter, carburation of the stream of air passing between the electrodes 70 and 72 of the igni-injector and the air collecting in said annular chamber 186 takes place.

Then ignition of the stream of carburated air passing through the annular conduit 188, is caused by the spark struck between the electrodes 70 and 72.

Then ignition, at high speed corresponding to the speed of the gaseous current, plus the speed of propagation of the flame, through the conduit 188, takes place from the point in which the spark is struck to the zone of the carburated mixture contained in the annular chamber 186 of the igni-injector.

Then follows combustion of this carburated mixture, and a volume increase with an increase in pressure of the generated gases, which causes an instantaneous flow of ignited gas from the annular chamber 186 and through the conduit 188, to the compression chamber of cylinder C.

The ignition of the carburated air present in the chamber of cylinder C, by contact with the stream of ignited gases, coming out from conduit 188, causes a whirling motion to be imparted to the air.

This causes ignition and combustion of the fuel left in cylinder C, the injector continuing to inject a truncated cone shaped jet, into the central zone of the generated vortex which continues till the complete combustion of the fuel in the chamber.

Expansion of the burned gases continues until the piston of the engine is pushed to its lower dead center.

Thereafter, opening of the discharge valve of cylinder C occurs, igni-injector piston 34 returns to its initial position, because of the action of spring 35.

Total exhaust expulsion of the burned gases from the annular chamber 186 of the igni-injector then takes place during the movement of piston 34 back to the initial position.

All the above, and further variants, which might easily be conceived by those skilled in the art, will fall within the purview of the attached claims.

What I claim is:

1. The fuel injection method for a combustion chamber of a cylinder in an internal combustion engine having an electrical ignition system, comprising providing a supply of air to said chamber, compressing said air in said chamber and simultaneously conducting a portion of said compressed air into a pre-ignition zone of variable volume connected to said chamber, directing a supply of preheated and pressurized fuel into said air during said compression in a direction counter to the movement of said compressed air toward said zone to form a finely dispersed mixture of fuel and air, said injection of fuel establishing a vortex current flow of said mixture in said chamber, and igniting said mixture during said fuel injection, said ignition occurring at a point intermediate the said chamber and the said zone.

2. The fuel injection method for a combustion chamber of a cylinder in an internal combustion engine having an electrical ignition system, comprising providing a supply of air to said chamber, compressing said air in said chamber and simultaneously conducting a portion of said compressed air into a pre-ignition zone of variable volume connected to said chamber, injecting a supply of fuel which has been preheated and is of a pressure greater than the pressure of the compressed air into said air during said compression in a direction counter to the movement of said compressed air toward said zone to form a finely dispersed mixture of fuel and air, said injection of fuel establishing a vortex current flow of said mixture in said chamber, and igniting said mixture during said fuel injection, said ignition occurring at a point intermediate the said chamber and the said zone.

3. The fuel injection method for a combustion chamber of a cylinder in an internal combustion engine having an electrical ignition system, comprising providing a supply of air to said chamber, compressing said air in said chamber and simultaneously conducting a portion of said compressed air into a pre-ignition zone of variable volume connected to said chamber, injecting a supply of fuel which has been preheated in the absence of air and brought to a pressure greater than the pressure of the compressed air into said air during said compression in a direction counter to the movement of said compressed air toward said zone to form a finely dispersed mixture of fuel and air, said injection of fuel establishing a vortex current flow of said mixture in said chamber, and igniting said mixture during said fuel injection, said ignition occurring at a point intermediate the said chamber and said zone.

4. The fuel injection method as described in claim 2 further comprising the step of employing a coolant to prevent the fuel from becoming overheated during the said pressurizing and heating.

5. The fuel injection method as described in claim 3 further comprising the step of maintaining the temperature of the fuel during the pressurization and preheating step below the critical temperature by a cyclic passage of coolant around the pressurization and preheating zone.

6. A fuel injection device for an internal combustion engine having an electrical ignition system comprising a shell connectable to a cylinder of said engine, means positioned in said shell and adapted to be actuated by pressure in said cylinder to form a chamber connectable to said cylinder, fueling means connected to said chamber forming means and spark forming means to provide ignition at a point intermediate said chamber and said cylinder, one element of said spark forming means being movable.

7. A fuel injection device for an internal combustion engine having an electrical ignition system, comprising a shell connectable to the combustion chamber of a cylinder in said engine, means positioned in said shell and adapted for movement by the compression stroke in said combustion chamber to form a pre-ignition mixing chamber connectable to said combustion chamber pumping means positioned on the side of said chamber forming means opposite from said combustion chamber and connected to said chamber forming means, fuel delivery means positioned on said chamber forming means adjacent said combustion chamber, and spark forming means, one element of which is movable with said chamber forming means, to provide ignition at a point intermediate said combustion chamber and said pre-ignition mixing chamber.

8. A fuel injection device for an internal combustion engine having an electrical ignition system, comprising a shell connectable to the combustion chamber of a cylinder in said engine, chamber forming means positioned in said shell and adapted for movement by the compression stroke in said combustion chamber to form a pre-ignition mixing chamber on the side adjacent said combustion chamber, said chamber forming means further being adapted to form a coolant chamber assembly on the side opposite said mixing chamber, pumping means positioned above said coolant chamber and connected to said chamber forming means for movement therewith to alternately pump coolant and fuel through respective conduits of the said fuel injection device, fuel injection means connected with said pumping means, said injection means being positioned on said chamber forming means adjacent said combustion chamber, and spark forming means, one element of which is movable with said chamber forming means, to provide ignition at a point intermediate said combustion chamber and said pre-ignition mixing chamber.

9. A fuel injection device for an internal combustion engine having an electrical ignition system, comprising a shell connectable to the combustion chamber of a cylinder in said engine, a first cylinder-piston means positioned in said shell and adapted for movement by the compression stroke in said combustion chamber to form a pre-ignition mixing chamber, said first cylinder-piston means further being adapted to form a coolant chamber assembly on the side opposite said mixing chamber, a second cylinder piston means positioned above said coolant chamber and connected to said first cylinder-piston means for movement therewith to alternately pump coolant and fuel through respective conduits of the said fuel injection device, fuel injection means connected with said second cylinder-piston means, said injection means being positioned on said first cylinder-piston means adjacent said combustion chamber and spark forming means, one element of which is movable with said first cylinder-piston means, to provide ignition at a point intermediate said combustion chamber and said pre-ignition mixing chamber.

10. A fuel injection device for an internal combustion engine having an electrical ignition system, comprising a shell connectable to the combustion chamber of a cylinder of said engine by a tubular extension, a first recess in said shell adjacent said extension and connected therewith, a spring-biased piston assembly positioned in said recess and adapted for movement against said spring by the compression stroke in said combustion chamber to form a pre-ignition mixing chamber on the lower side of said piston and a coolant chamber on the upper side of said piston, a tubular stem projecting from said piston through said coolant chamber assembly, pumping means connected to said tubular stem to alternately pump coolant and fuel through respective conduits in said ignition device, fuel injection means connected by conduits with said pumping means, said injection means being positioned on the lower side of said piston and extending therefrom through said tubular extension, spark forming means, one element of which is movable with said piston, to provide ignition at a point intermediate said combustion chamber and said pre-ignition mixing chamber.

11. A fuel injection device for an internal combustion engine having an electrical ignition system, comprising a first shell connectable to the combustion chamber of a cylinder of said engine by a tubular extension, a second shell of electrical insulating and heat resistant material fitted within said first shell, a first recess in said second shell adjacent said extension and connected therewith, a spring-biased piston assembly positioned in said first recess and movable alternately in opposite directions by the compression stroke in said combustion chamber and said spring, said movements alternately forming a pre-ignition mixing chamber on the lower side of said piston and a coolant chamber assembly on the upper side of said piston, a second recess in said second shell and positioned axially above said first recess, a second piston slidably fitted into said recess and connected to an upwardly projecting tubular stem of said piston assembly, said second piston and said recess alternately forming a coolant-lubricant pumping chamber on the upper side of said piston and a fuel pumping chamber on the lower side of said piston, conduits connecting said fuel pumping chamber with a fuel collecting chamber formed in the lower portion of said tubular stem of said piston assembly for pressurizing and preheating said fuel, a tubular projection extending downwardly from the lower side of said piston assembly into the bore of said extension of said shell in a spaced relationship to form an annular conduit between said combustion chamber and said mixing chamber, a fuel injection valve assembly positioned in said projection connected with said fuel collecting chamber, a first electrode positioned on the lower interior wall of said extension of said shell and a second electrode assembly positioned on the lower surface of said tubular projection to provide ignition at a point intermediate said combustion chamber and said pre-ignition mixing chamber.

12. A fuel injection device for an internal combustion engine having an electrical ignition system, comprising a first shell connectable to the combustion chamber of a cylinder of said engine by a tubular extension, a second shell of electrical insulating and heat resistant material fitted within said first shell, a first recess in said second shell adjacent said extension and connected therewith, a spring-biased piston assembly positioned in said first recess and movable alternately in opposite directions by the compression stroke in said combustion chamber and by said spring, said movements alternately forming a pre-ignition mixing chamber on the lower side of said piston and a coolant chamber assembly on the upper surface of said piston comprising an outer annular chamber and an inner annular chamber interconnected by a plurality of passageways, a second recess in said second shell positioned axially above said first recess, a second piston slidably fitted into said second recess and connected to an upwardly projecting tubular stem of said piston assembly, said second piston and said second recess alternately forming a coolant-lubricant pumping chamber on the upper side of said piston and a fuel pumping chamber on the lower side of said piston, conduits connecting said fuel pumping chamber with a fuel collecting chamber for pressurizing and preheating said fuel, conduits leading from said coolant-lubricant pumping chamber to said coolant chamber, said fuel collecting chamber being formed in the lower portion of said tubular stem of said piston assembly, a tubular projection extending downwardly from the lower side of said piston assembly into the bore of said extension of said shell in a spaced relationship to form an annular conduit between said combustion chamber and mixing chamber, a fuel injection valve assembly positioned in said projection connected with said fuel collecting chamber, the lower end of said valve assembly bearing a discharge nozzle, a first electrode positioned on the lower interior wall of said extension of said shell and a second electrode assembly positioned on the lower surface of said tubular projection to provide ignition at a point intermediate said combustion chamber and said mixing chamber.

13. A fuel injection device for an internal combustion engine having an electrical ignition system, comprising a first shell connectable to the combustion chamber of a cylinder of said engine by a tubular extension, a second shell of electrical insulating and heat resistant material fitted within said first shell, a first recess in said second shell adjacent said extension and connected therewith, a spring-biased piston assembly positioned in said first recess and movable alternately in opposite directions by the compression stroke in said combustion chamber and said spring, said movements alternately forming a pre-ignition mixing chamber on the lower side of said piston and a coolant chamber assembly on the upper surface of said piston, said coolant chamber comprising an outer annular chamber and an inner annular chamber interconnected by a plurality of passageways, a second recess in said second shell positioned axially above the first recess, a second piston slidably fitted into said second recess and connected to an upwardly projecting tubular steam of said piston assembly, said second piston and said second recess alternately forming a coolant-lubricant pumping chamber on the upper side of said piston and a fuel pumping chamber on the lower side of said piston, conduits connecting said fuel pumping chamber with a fuel collecting chamber to pressurize and preheat said fuel, pressure accumulators for fuel being interposed between said pumping chamber and said collecting chamber, conduits leading from said coolant-lubricating pumping chamber to said coolant chamber by way of pressure accumulators for said coolant-lubricant, said fuel collecting chamber being formed in the lower portion of said tubular stem, a tubular projection extending downwardly from the lower side of said piston into the bore of said extension of said shell in a spaced relationship to form an annular conduit between said combustion chamber and said mixing chamber, a fuel injection valve assembly positioned in said projection, the lower end of said valve assembly bearing a discharge nozzle, a first electrode positioned on the lower interior wall of said extension of said shell and a second electrode assembly positioned on the lower surface of said tubular projection to provide a point of ignition intermediate said mixing chamber and said combustion chamber.

14. A fuel injection device for an internal combustion engine having an electrical ignition system, comprising a shell connectable to the combustion chamber of a cylinder of said engine by a tubular extension, a first recess in said shell adjacent said extension and connected therewith, said first recess being defined by a disk of heat resistant and electrical insulating material fitted into the bottom of said shell, a cylinder electrically insulated from said shell and a plate fitted into the upper portion of the wall of said cylinder, a spring-biased piston assembly positioned in said first recess and movable alternately in opposite directions by the the compression stroke in said combustion chamber and said spring, said movements alternately forming a pre-ignition mixing chamber defined by said disk, the lower portion of said cylinder and the lower side of said piston and a coolant chamber assembly defined by the upper surface of said piston, the upper portion of said cylinder and the lower surface of said plate, said coolant chamber assembly comprising an outer annular chamber and an inner annular chamber separated by a second cylinder fitted into the upper surface of said piston and having peripheral holes near the upper end thereof, a cylindrical block positioned above said plate but in contact therewith, said block being electrically shielded from said shell, a first recess in said block adjacent the upper surface of said plate, a first piston slidably fitted into said first block recess and connected to an upwardly projecting tubular stem of said piston assembly slidably fitted into a bore in said plate, said first piston and said first block recess alternately forming a coolant-lubricant pumping chamber on the upper side of said piston and a fuel pumping chamber on the lower side of said piston, conduits in said block connecting said fuel pumping chamber with a fuel delivery chamber formed in a second recess in the upper portion of said block, pressure accumulators for fuel interposed in said conduits, a conduit leading from said fuel delivery chamber axially through said first piston and then through said tubular stem of said piston assembly to a fuel collecting chamber formed in the lower portion of said tubular stem wherein said fuel is preheated and pressurized before injection into said combustion chamber, conduits leading from said coolant-lubricating pumping chamber by way of pressure accumulators to said coolant chamber, a tubular projection depending from the lower side of said piston assembly in said first recess into the bore of said extension of said shell in a spaced relationship to form an annular conduit between said combustion chamber and said mixing chamber, a fuel injection valve assembly positioned in the bore of said projection, the upper end of said valve assembly being connected with said fuel collecting chamber, the lower end of said assembly bearing a discharge nozzle, an annular electrode positioned on the interior surface of the bore of said shell extension, at least one electrode positioned on the lower surface of said piston assembly projection to provide ignition of said fuel at a point intermediate of said combustion chamber and said mixing chamber.

References Cited by the Examiner

UNITED STATES PATENTS

| 1,749,975 | 3/1930 | Groff | 123—139.9 |
| 2,203,669 | 6/1940 | Butler | 123—139.9 |
| 2,596,360 | 5/1952 | Blakeway | 123—139.9 |
| 2,642,315 | 6/1953 | French | 123—139.9 |
| 2,977,941 | 4/1961 | Hockel | 123—32.9 |
| 2,986,134 | 5/1961 | Bernard | 123—139.9 |

FOREIGN PATENTS

| 47,930 | 5/1937 | France. |
| | | (4th addition to 799,951) |
| 1,274,295 | 9/1961 | France. |
| 714,126 | 8/1954 | Great Britain. |

MARK NEWMAN, *Primary Examiner.*

RICHARD B. WILKINSON, *Examiner.*